(12) United States Patent
Naro et al.

(10) Patent No.: US 7,618,473 B1
(45) Date of Patent: Nov. 17, 2009

(54) METHOD FOR IMPROVING OPERATIONAL EFFICIENCY IN CLOGGED INDUCTION MELTING AND POURING FURNACES

(75) Inventors: Rodney L. Naro, 19620 Edgecliff Dr., Euclid, OH (US) 44119; David C. Williams, Hillard, OH (US)

(73) Assignee: Rodney L. Naro, Euclid, OH (US)

( * ) Notice: Subject to any disclaimer, the term of this patent is extended or adjusted under 35 U.S.C. 154(b) by 334 days.

(21) Appl. No.: 11/496,953

(22) Filed: Aug. 1, 2006

Related U.S. Application Data

(63) Continuation-in-part of application No. 10/695,248, filed on Oct. 27, 2003, now abandoned.

(51) Int. Cl.
*B08B 9/027* (2006.01)
*B08B 9/053* (2006.01)

(52) U.S. Cl. ............ 75/10.47; 373/146; 75/10.48; 75/10.5; 75/10.57; 134/8; 134/21; 134/22.1

(58) Field of Classification Search .......... 266/216, 266/225; 75/10.47, 10.48, 10.5, 10.54, 10.57; 264/30, 309; 134/5, 93
See application file for complete search history.

(56) References Cited

U.S. PATENT DOCUMENTS

| | | | |
|---|---|---|---|
| 804,785 A | 7/1905 | Wedge | |
| 1,298,229 A * | 3/1919 | Levy | 266/216 |
| 2,272,277 A | 2/1942 | Ramsey et al. | |
| 2,501,138 A | 3/1950 | Parker | |
| 2,760,859 A | 8/1956 | Graf | |
| 2,780,541 A | 2/1957 | Zifferer | |
| 2,862,809 A | 12/1958 | Threlkeld | |
| 3,421,886 A | 1/1969 | Schelleng | |
| 3,618,917 A * | 11/1971 | Fredrikson et al. | 266/220 |
| 3,721,547 A | 3/1973 | Dvorak et al. | |
| 3,798,027 A | 3/1974 | Defranco et al. | |
| 4,014,685 A * | 3/1977 | Jones et al. | 75/309 |
| 4,137,071 A | 1/1979 | Mrdjenovich | |
| 4,152,150 A | 5/1979 | Frantzreb, Sr. | |
| 4,192,490 A * | 3/1980 | Nilsson et al. | 266/225 |
| 4,350,324 A * | 9/1982 | Kramer | 266/44 |
| 4,390,362 A | 6/1983 | Khusnutdinov et al. | |
| 5,008,074 A | 4/1991 | Naro et al. | |
| 5,100,612 A | 3/1992 | Obata et al. | |
| 5,268,141 A | 12/1993 | Ototani et al. | |
| 5,279,639 A * | 1/1994 | Kemeny et al. | 75/309 |
| 5,559,827 A | 9/1996 | Shimada et al. | |
| 5,591,271 A * | 1/1997 | Baeck et al. | 134/8 |
| 6,102,983 A | 8/2000 | Skaland | |
| 6,293,988 B1 | 9/2001 | Naro | |
| 6,602,316 B1 | 8/2003 | Leshchinsky et al. | |

OTHER PUBLICATIONS

R.L. Naro and J.F. Wallace, "Minor Elements In Gray Iron, Background for the Development of a non-Ferrosilicon based Inoculant," Report of Research Project, AFS Gray Iron Division, American Foundrymen's Society (1970).

\* cited by examiner

*Primary Examiner*—George Wyszomierski
*Assistant Examiner*—Tima M McGuthry-Banks
(74) *Attorney, Agent, or Firm*—Renner, Otto, Boisselle & Sklar, LLP

(57) ABSTRACT

A method of restoring the electrical efficiency of channel and pressure pour furnaces includes plunging a fluxing material with a specially designed plunging lance. The plunging lance chamber containing the fluxing material is 24 to 32 inches in length, 3 inches in diameter and has a capacity to hold 5 to 7.5 pounds of flux briquettes. The plunging chamber has holes drilled along the length of the body. The fluxing material contains by weight from 8.0 to 28.7% $CaCO_3$ (calcium carbonate or limestone), from 0 to 18.5% $MgCO_3$ (magnesium carbonate), from 3.6 to 18.0% $Al_2O_3$ (alumina) from 1.4 to 7.1% $SiO_2$ (silica), in the form of a complex aluminosilicate, and from 19.4 to 46.4% $Na_2O$ (sodium oxide), in the form of soda ash (sodium carbonate). The total level of sodium ranges from 23 to 26% and up to 10% sodium fluoride or sodium chloride may be substituted for soda ash.

8 Claims, 2 Drawing Sheets

METHOD FOR IMPROVING OPERATIONAL EFFICIENCY IN CLOGGED INDUCTION MELTING AND POURING FURNACES

This application is a continuation in part of U.S. patent application Ser. No. 10/695,248, filed Oct. 27, 2003 now abandoned, which is hereby incorporated by reference in its entirety.

BACKGROUND OF THE INVENTION

1. Technical Field of the Invention

The invention relates specifically to a flux-filled plunging lance and procedures to repair and restore the operating efficiency and capacity of slag-clogged channel and pressure-pour furnaces used for melting and pouring gray, ductile and compacted graphite irons. The invention can be used for non-ferrous melting and pouring applications. The proprietary additives are included as part of the invention as well as the design of the plunging assembly.

2. Description of the Related Art

Induction furnaces are refractory lined vessels that utilize electrical current flowing through copper coils to create an electromagnetic or induction field on the inside and outside of the coil. When electrical current from the coils is passed through the metallic furnace charge, joule heating creates thermal energy that melts the charge. Any metallic charge or molten metal mass passing through this induction field will generate heat internally and will eventually melt or will rise in temperature in the case of molten metal. The magnetic currents that arise in the molten metal produce an intense stirring action, thus insuring a homogenous liquid.

During the melting process, insoluble non-metallics or metallic oxides are generated from oxidation products, dirt, sand and other impurities from the scrap, erosion and wear of the refractory lining, oxidized ferroalloys, and other various sources. These non-metallics remain in the liquid metal as an emulsified "slag" until such time as they increase in size and buoyancy, coalesce and float on the liquid metal where they can be removed. Almost without exception, these generated slags will normally deposit in the upper portion of the lining or on side crucible walls. These areas are at a much lower temperature than the center of the furnace walls. Insoluble metallic oxides and sulfides that remain suspended within the molten metal will eventually deposit in areas where there is an interruption in the mechanical flow of the molten metal in the induction field. This normally corresponds to the midway point of the active power coil, along the vertical sidewall on the refractory lining. Eventually the clogging or restriction of furnace capacity will render the furnace useless and will affect the melting electrical efficiency.

Coreless induction furnaces can melt a wide range of metals. Steels, which melt at 2875° F. and higher, the entire family of cast irons which include gray and ductile irons with melting ranges of 2,475 to 2,850° F., and non-ferrous metals such as copper-base alloys (melting range of 1975° F. and higher) and aluminum-base alloys (melting range of 1175° F. and higher), can all be melted in induction furnaces.

An important type of induction furnace is the channel furnace. The principal difference between the two furnace types is in the placement of the induction coil and the metal bath. In coreless furnaces, the induction coil completely surrounds the melt cavity. In a channel furnace, the induction coil is part of an inductor assembly that performs the function of a "superheater of molten metal". The concept is that the coil will create an induction field around the outside of the coil, and a separate loop or channel is placed at the optimal distance within the strength of the induction field. As molten metal is passed through this channel, the temperature will increase. This "heated molten metal" will then exit the inductor channel and eventually be displaced into a much larger volume of molten metal which is referred to as the "uppercase" that contains the major portion of the metal bath. This heating process and dispensing of the "heated metal" is a continuous process so long as power is available to the induction coil. When the induction channel experiences a clog or restriction in the molten metal flow, the electrical efficiency of the inductor is affected immediately and lost production from the inability to melt metal will result. Channel furnaces are typically used for processing cast irons, copper-base and aluminum-base alloys; they are not used for the processing of steel and steel alloys.

A type of channel furnace is the vertical channel furnace; it is often viewed as a large bull ladle or crucible with an inductor attached to the bottom. Accumulations of slag over time will typically occur in the bottom inductor loop or throat area. When this happens, insufficient metal flow through the inductor loop hampers heat transfer and interferes with the melting operation.

Typically, inductor life may be as long as 18 months. However, if slag build up occurs, the useful life may be reduced to only a few months or in some extreme cases, a few weeks. It is very difficult to remove accumulations of slag from the inductor loop or throat area. Often, the furnace will have to be taken out of operation and a new inductor installed. Because of the design of the furnace, access to the inductor loop is limited because it is covered by molten metal. Draining the furnace may allow visual access to the inductor throat and loop area, but mechanically scraping the slag buildup, which is normally quite hard and tenaciously adheres to the loop wall, is extremely difficult.

Pressure pour furnaces are sealed holding furnaces normally blanketed with a nitrogen atmosphere and that also have an induction coil attached to the bottom of the furnace. Pressure pour furnaces are designed to hold liquid metal at a constant temperature for periods of 1 to 3 days. When the pressure pour furnace is pressurized, a stream of molten metal exits the vessel for mold filling. These furnaces are not designed to melt metal. Circulation of liquid metal through the inductor throat or loop provides the heating of liquid metal to keep a constant temperature in the furnace.

Slags and/or drosses from the above-mentioned electric melting methods, if not totally removed at the melting furnace, will be transferred to the metal pouring ladles and eventually into the finished casting. This build-up must constantly be removed and a significant amount of labor is usually expended in keeping melting and pouring furnaces clean. Insoluble clogging and build-up often occurs in the inductor channels and throat transition areas. When this happens, the inductor will have to be replaced, since it is extremely difficult to remove the restricted clogged condition. If this condition is left unaddressed and slag buildup is not removed, molten metal will breach the inductor refractory and molten metal will run out of the furnace inductor. This is true for ferrous cast iron and non-ferrous channel furnaces and such run-outs represent a serious safety hazard.

Some success in removing slag buildup in inductor loops with specially designed fluxes have been reported by some cast iron and copper-base foundries but treatments may take several days of continuous flux additions. However, when severe restrictions from buildup occur, the furnace must be drained and a new inductor installed.

The addition of a flux to any molten metal traditionally lowers the melting point of slag. This action prevents the slag from freezing on the refractory surfaces. The use of a flux will usually ensure floatation of the emulsion of oxides and reduce the melting point of the slag to below the coldest temperature encountered in the melting, treatment and handling system to minimize slag build-up.

The use of fluxes can affect three important physical characteristics of slags: melting point, viscosity and wetting ability. Generally, slag is required to remain liquid at temperatures likely to be encountered during melting, metal treatment, or metal handling. Slag is required to be fluid for ease of removal from the melting furnace, to promote good slagging reactions and to prevent build-up in channel furnace throats and loops as well as coreless furnace sidewalls. In electric furnaces and pressure pour furnaces, slags must have a high interfacial surface tension to prevent refractory attack and to facilitate slag remove from the surface of the molten metal.

Most fluxes contain alkaline elements, such as sodium or calcium or barium, along with halide salts. Alkali metal halide salts with the elements of sodium and potassium are also commonly used in fluxes. Over the years, almost every conceivable combination of these compounds has been formulated into fluxes. Most commercial fluxes have been developed for the steel industry and for copper and aluminum melting applications. Very few fluxes have been developed for the electric melting segment of the cast iron industry, and those that have been developed, have been aimed at supplemental flux additions for cupola melting. Part of the reason is that silica-based refractory linings, because of low cost, are the preferred refractory of gray and ductile iron foundries. Fluxes that have been developed for the steel industry, where much higher quality refractories are used, will vigorously attack silica linings, hence, relatively few fluxes have been developed for this segment of the casting industry.

Fluorspar, a calcium fluoride mineral ($CaF_2$), is a powerful fluxing agent that is commonly used in various proportions along with limestone and other metal halides or salts to improve slag fluidity in foundry cupola melting. Fluorspar, while effective, has certain serious disadvantages. Specifically, fluorspar is a very aggressive flux and works extremely well in integrated steel mill applications as well as cupola operations where non-silica refractory linings are normally employed. However, overzealous additions of fluorspar or fluorspar containing fluxes to electric melting furnaces will result in severe lining erosion.

From the foregoing it will be appreciated that serious shortcomings exist in cast iron and non-ferrous melting where channel furnaces or pressure pour vessels are employed. Elimination of inductor clogging and restrictions from slag buildup continues to be a troublesome problem and current methods to solve these problems usually involve taking the furnace off-line and replacing the clogged or restricted inductor.

SUMMARY OF THE INVENTION

It has now been discovered that it is possible to revive or restore the electrical properties of a channel or pressure pour furnace by simply immersing an expendable flux containing thick-walled pipe into the inductor loop of either channel or pressure pour furnaces. The pipe is filled with a specially formulated, briquetted flux based on sodium salts and halides, magnesium and calcium carbonates, and aluminum silicates. The pipe contains multiple holes to release the flux into the slag-clogged or slag-restricted inductor loop. When plunged into the inductor loop, this device eliminates slag-clogging restrictions in inductor loops of channel furnaces or pressure pour furnaces that improves operational efficiency.

Aspects of this invention relate to 1) configuration of the fabricated plunging assembly and 2) the composition and form of the flux used in the plunging tube.

According to an aspect of this invention, the steel tube into which the flux is placed, is fabricated from a plain carbon steel, typically of SAE 1010 to 1020 composition, containing 0.10% to 0.20% carbon, 0.35% silicon and 0.55% manganese, the balance being iron. The length of the plunging tube is typically 32 inches, having an outside diameter of 3.0 inches and a 0.25 inch wall thickness. Into the body of the plunging tube, 0.25 inch diameter holes are uniformly drilled. The plunging tube is filled with the briquetted flux and the assembly is suitable end caps to which steel bars are welded.

According to another aspect of this invention, the flux briquettes are packed into the plunging tube and consist of sodium oxide, sodium fluoride, calcium and magnesium carbonates, aluminum oxide and silicon dioxide.

According to another aspect of the invention, a method of plunging the flux and fluidizing the clog/restriction in molten metal includes adding a flux composition to the metal.

Another aspect of the invention is to provide a flux addition to be utilized in the above-mentioned apparatus or device that will allow for the rapid softening and removal of inductor clogging slag phases.

To the accomplishment of the foregoing and related ends, the invention comprises the features hereinafter fully described and particularly pointed out in the claims. The following description sets forth in detail certain illustrative embodiments of the invention. These embodiments are indicative, however, of but a few of the various ways in which the principles of the invention may be employed. Other objects, advantages and novel features of the invention will become apparent from the following detailed description of the invention.

BRIEF DESCRIPTION OF DRAWINGS

In the annexed drawings,

Drawing 1 is a side view of an expendable plunging apparatus in accordance with an embodiment of the invention; and Drawing 2 is a sectional view along Section A-A of Drawing 1.

DETAILED DESCRIPTION

Figure 1:
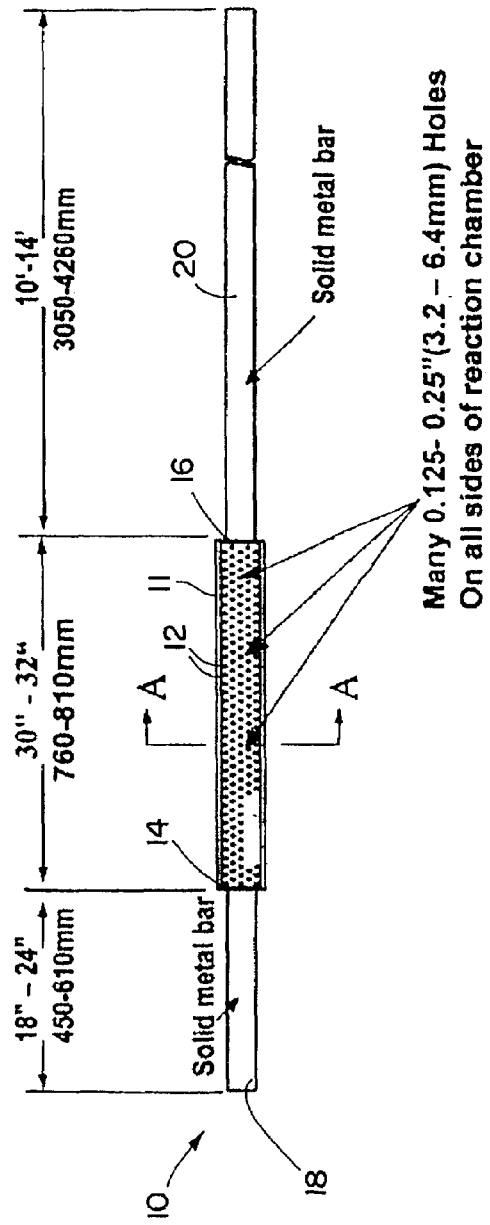
Figure 2:
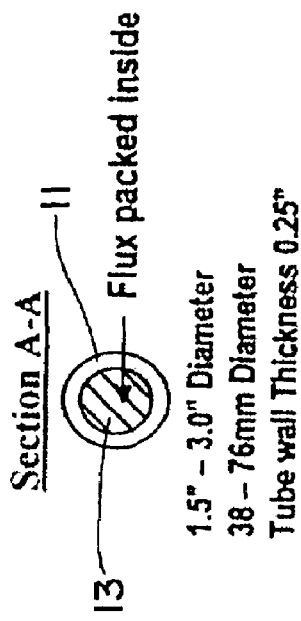

A fabricated plunging assembly is used for immersion into channel or pressure pour furnaces used to melt gray and ductile irons, copper-base alloys, aluminum-based alloys and zinc-based alloys. The plunging assembly is fabricated from a steel tube into which holes are drilled. The actual diameter of the holes is not critical but the holes must be small enough to contain the briquetted flux tablets. The length of the steel bars is such that the shorter bar acts as a channel loop locator when the plunging assembly is inserted under the molten metal bath. The longer of the steel bars is used as a handle for plunging the entire assembly under the molten bath and must be long enough to allow insertion of the tube into the body of the channel loop.

The dimensions depicted in Drawings 1 and 2 are representative of plunging assemblies that have successfully been used to unclog restricted inductor loops and restore the furnace back to its original efficiency. The apparatus 10 is constructed out of plain carbon steel with a composition of SAE 1010 or 1020. The inside diameter of the thick-walled tube 11 can vary between 2.5 to 3.0 inches, the outside diameter can vary between 3.0 to 3.5 inches, the wall thickness of the tube is nominally 0.25 inches, and contains 0.25 inch diameter holes 12 drilled along the body of the tube. The length of the tube may vary from 24 inches to 32 inches depending on the amount of flux 13 that needs to be added. Iron end plugs 14 and 16 are used to seal the tube and two steel bars 18 and 20 of different lengths are welded to the end caps that have been placed on the tube. The length of the shorter steel bar 18 is 18 to 24 inches, and the length of the larger bar 20 is 10 feet to 14 feet. The diameter of the steel bars 18 and 20 may vary between 0.75 to 1.0 inches. The length of the longer bar 20 is such that the bar 20 can be plunged into the inductor loop from the top of the furnace, and used as a handle to hold the apparatus 10. The shorter bar 18 is used as a feeler bar to locate the inductor throat or loop when it is immersed in the molten bath.

It will be appreciated that the dimensions of the apparatus given in Drawings 1 and 2 and discussed above are examples of suitable dimensions, and that other suitable dimensions may be used instead.

The flux is added to the plunging tube as a briquetted tablet so as to stay within the confines of the tube during immersion. The composition of the flux is such that it vigorously dissociates into CO gas bubbles. The rapid release of CO bubbles is quite reactive and literally tends to physically disrupt the glass-like slag from sticking to the inductor walls. In addition, the flux also dissociates into sodium compounds that subsequently react to form sodium aluminates. Calcium carbonate dissociates and reacts with aluminum silicates to form calcium aluminates. Both of these compounds act as fluxes to soften the adhering slag on the inductor loop sidewalls and assist in the floatation of the slag out of the inductor loop and into the body of the furnace, where it can be removed by skimming. The holes in the cylindrical tube allow for the controlled escape of the generated gases.

The composition of the flux briquettes is an important component of the plunging apparatus. The flux must first release a controlled and large volume of high velocity carbon monoxide bubbles that tend to blow the slag off of the channel furnace inductor loop. Simultaneously, the flux both softens the buildup and reduces its melting temperature so that the buildup slag phase migrates to the top of the furnace, where it is skimmed off.

The method of fluxing and removing the slag formed in channel furnaces and pressure pour furnaces involves adding a suitable fluxing material composed of from 8.0 to 28.7% $CaCO_3$ (calcium carbonate or limestone), from 0 to 18.5% $MgCO_3$ (magnesium carbonate), from 3.6 to 18.0% $Al_2O_3$ (alumina), and from 1.4 to 7.1% $SiO_2$ (silica). With regard to the levels of $Na_2O$, the amount of soda oxide may be 33.2 to 45.76% by weight. More importantly, the amount of sodium will range from 24.63 to 33.95% by weight. The sodium level may be modified by addition of sodium chloride or sodium fluoride, while still keeping the amount of sodium in the 24.63 to 33.95% by weight range.

The flux serves to improve and reduce the fluidity and viscosity of the slag, reduce the melting temperature, remove and coalesce emulsified slag particles, and soften build-up on furnace sidewalls and inductor throats, without emitting gases harmful to the atmosphere.

According to one specific example, a flux formulation was prepared from approximately 43.5 parts by weight of soda ash ($Na_2CO_3$) (corresponding to 30.7 parts by weight of sodium oxide ($Na_2O$)), 10 parts by weight of sodium fluoride (NaF), 15.5 parts of calcium carbonate ($CaCO_3$), 13.0 parts of magnesium carbonate ($MgCO_3$), 11.65 parts of an alumina ($Al_2O_3$), and 5.0 parts of silica ($SiO_2$). It will be appreciated that a variety of different suitable grades of limestone may be employed to provide calcium carbonate and/or magnesium carbonate. These constituents in particulate form were thoroughly admixed and then compressed using a rotary briquetting press. The particle size range of the ingredients is important to ensure mechanical interlocking during the roll briquetting stage. Tablets weighting approximately 0.25 ounces (7 grams), 0.5 ounces (14 grams), and 1.5 ounces (28 grams) were produced. The resulting briquettes or tablets (agglomerations) were structurally sound and could withstand continued dropping from a height of 10 feet over a dozen times without breaking.

A "powder," as the term is used herein, may have a size range from +20 mesh to −100 mesh. An "agglomeration," as the term is used herein, includes anything bigger than a powder.

The addition of between 0.01 to 0.75% by weight of the metallic charge has been sufficient to prevent slag build up on furnace walls and keep inductor loops and throats open. In one instance, the addition of 0.25 lbs (114 grams) of flux to 1,500 lbs (680 kg) of metallic charge in a coreless induction furnace was sufficient to prevent build-up of slag on the sidewalls.

It is preferred to make the flux additions as briquettes, pellets or other agglomerated forms, for purposes of convenience and control of the quantity of addition and to minimize stack losses. However, other suitable techniques of incorporating the flux with the charge may be used.

The resulting flux constituents will dissociate upon exposure to metal casting temperatures, and react to form calcium silicon aluminates and sodium aluminum silicates. The reaction products provide superior fluxing results without the disadvantage of other fluxes described heretofore.

From a quantitative standpoint, the particular flux briquettes prepared as aforementioned contain about 16% $CaCO_3$, about 13% $MgCO_3$, about 12% $Al_2O_3$, about 53% $Na_2CO_3$, about 5.0% $SiO_2$, and about 1% by weight of an internal release agent.

The fluxing composition may contain $CaCO_3$, $Al_2O_3$, $MgCO_3$, $Na_2O$, and $SiO_2$. The $CaCO_3$ may vary by weight from about 8.0 to 28.7%, may vary by weight from about 8.0 to 22.0%, may vary by weight from about 8.0 to 18.3%, and may vary by weight from about 12 to 16%. The $Al_2O_3$ may vary by weight from about 3.6 to 18.0%, and may vary by weight from about 8 to 14%. The $MgCO_3$ may vary by weight from about 0 to 18.5%, may vary by weight from about 6.7 to 18.5%, and may vary by weight from about 11.5 to 15%. The $Na_2O$ may vary by weight from about 19.4 to 46.4%, and may vary by weight from about 26.1 to 31.9%. The $SiO_2$ may vary by weight from about 1.4 to 7.1%, and may vary by weight from about 4.5 to 6.5%.

The flux of the present invention is superior to fluorspar and/or blends of alkali earth salts or oxides since the current invention apparatus provides both a mechanical as well as chemical means of eliminating slag buildup in channel furnace inductor loops.

Flux trials were performed at a foundry that melts all types of gray and ductile irons and holds these irons in a 15-ton pressure pour vessel. This example foundry has been successful in removing slag build-up restrictions and restoring electrical properties without having to resort to costly downtime for changing pressure pour furnace inductors. When the inductor of the furnace became clogged or restricted with slag build-up, the conductance ratio, a measure of calculated electrical efficiency, dropped to a reading of 50. A normal reading for a new inductor without slag build-up would normally be in the range of 85 to 105. After withdrawing metal from the pressure pour vessel so that only 6 tons of metal remained, the plunging tube was immersed into the metal bath. The plunging tube had the dimensions shown in Drawing 1, that being a 3.0 inch outside diameter tube, 30 inches long, and it was filled with 7.75 pounds of the aforementioned sodium based flux briquettes. After immersing the plunging assembly into the bath, the conductance ratio increased to approximately 75 within one hour. Adding additional flux in bulk form to the top of the furnace bath allowed full restoration of electrical efficiency and the conductance ratio continued to increase to 95. Without plunging the flux composition into the inductor loop with the plunging apparatus, the furnace inductor would have to have been replaced.

Although the invention has been shown and described with respect to a certain embodiment or embodiments, it is obvious that equivalent alterations and modifications will occur to others skilled in the art upon the reading and understanding of this specification. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of fluxing and removing slag clogging restrictions in an inductor loop of a pressure pour or channel furnace, the method comprising:
    providing an apparatus that includes:
        a hollow tube having holes therein;
        a feeler bar attached to one end of the tube;
        a handle attached to an opposite end of the tube; and
        a fluxing additive filling the tube;
        wherein the fluxing additive includes:
            calcium carbonate;
            magnesium carbonate;
            alumina;
            silica; and
            one or more of sodium oxide, sodium fluoride, and sodium chloride; and
    plunging at least part of the hollow tube of the apparatus into molten metal in the furnace, thereby introducing the fluxing additive into the molten metal.

2. The method of claim 1,
    wherein the plunging includes holding the apparatus by the handle; and
    wherein the plunging includes using the feed bar to locate the inductor loop.

3. The method of claim 1, wherein the additive includes:
    8 to 28.7% calcium carbonate;
    0 to 18.5% magnesium carbonate;
    3.6 to 18.0% alumina;
    1.4 to 7.1% silica; and
    19.4 to 46.4% sodium oxide, as soda ash.

4. The method of claim 1, wherein the additive includes:
    12 to 16% calcium carbonate;
    11.5 to 15% magnesium carbonate;
    8 to 14% alumina;
    4.5 to 6.5% silica;
    26.1 to 31.9% sodium oxide, as soda ash; and
    8 to 10% sodium fluoride.

5. The method of claim 1, wherein the additive is an agglomeration.

6. The method of claim 1, wherein the additive is a powder.

7. A method of fluxing and removing slag clogging restrictions in an inductor loop of a pressure pour or channel furnace, the method comprising:
    providing an apparatus that encloses a fluxing additive that includes:
        8 to 28.7% calcium carbonate;
        0 to 18.5% magnesium carbonate;
        3.6 to 18.0% alumina;
        1.4 to 7.1% silica; and
        19.4 to 46.4% sodium oxide, as soda ash; and
    introducing the fluxing additive into molten metal in the furnace by plunging part of the apparatus into the molten metal.

8. The method of claim 7, wherein the additive includes:
    12 to 16% calcium carbonate;
    11.5 to 15% magnesium carbonate;
    8 to 14% alumina;
    4.5 to 6.5% silica;
    26.1 to 31.9% sodium oxide, as soda ash; and
    8 to 10% sodium fluoride.

* * * * *

UNITED STATES PATENT AND TRADEMARK OFFICE
CERTIFICATE OF CORRECTION

PATENT NO. : 7,618,473 B1
APPLICATION NO. : 11/496953
DATED : November 17, 2009
INVENTOR(S) : Naro et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 405 days.

Signed and Sealed this

Fourteenth Day of December, 2010

David J. Kappos
*Director of the United States Patent and Trademark Office*